(12) United States Patent
Hickey

(10) Patent No.: US 8,580,219 B2
(45) Date of Patent: *Nov. 12, 2013

(54) AMMONIUM RECOVERY METHODS

(75) Inventor: Robert Hickey, Okemos, MI (US)

(73) Assignee: Coskata, Inc., Warrenville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,661

(22) Filed: May 4, 2012

(65) Prior Publication Data

US 2013/0029405 A1    Jan. 31, 2013

Related U.S. Application Data

(63) Continuation-in-part of application No. 13/190,355, filed on Jul. 25, 2011.

(51) Int. Cl.
  *C02F 11/00* (2006.01)
(52) U.S. Cl.
  USPC .......... 423/356; 423/365; 423/237; 210/603; 210/903; 435/243; 435/262
(58) Field of Classification Search
  USPC .................. 423/356, 365, 237; 210/603, 903; 435/243, 262
  See application file for complete search history.

(56) References Cited

U.S. PATENT DOCUMENTS

| | | | |
|---|---|---|---|
| 4,571,384 A | 2/1986 | Morita et al. | |
| 5,540,840 A | 7/1996 | Heitkamp et al. | |
| 6,802,974 B2 | 10/2004 | Rebholz et al. | |
| 7,416,644 B2 | 8/2008 | Bonde | |
| 7,569,146 B2 | 8/2009 | Peyton et al. | |
| 7,819,934 B2 | 10/2010 | Galliher et al. | |
| 7,831,389 B2 | 11/2010 | Yamada | |
| 7,866,638 B2 | 1/2011 | Neumann et al. | |
| 2003/0211585 A1 | 11/2003 | Gaddy et al. | |
| 2008/0302722 A1* | 12/2008 | Burke | 210/603 |
| 2009/0250401 A1* | 10/2009 | Kotelko et al. | 210/695 |
| 2010/0227377 A1 | 9/2010 | Adams et al. | |

* cited by examiner

*Primary Examiner* — Steven Bos

(57) ABSTRACT

The methods are utilized to recover ammonium from waste water using $CO_2$ acidified absorption water. The process is particularly suited for utilization of cellular matter and a $CO_2$ rich tail gas from a syngas fermentation process and derives significant benefit from the recovery of ammonium bicarbonate and ammonium carbonate. Ammonia and ammonium are recovered from the treatment of the syngas as an ammonium rich solution, at least a portion of which is recycled to the fermentation zone to aid in the production of liquid products. A carbon dioxide rich gas produced by fermentation is used to capture the ammonia and ammonium, forming the ammonium rich solution.

24 Claims, 4 Drawing Sheets

AMMONIUM RECOVERY METHODS

CROSS REFERENCE TO RELATED APPLICATIONS

This application is a continuation-in-part of copending patent application Ser. No. 13/190,355, filed Jul. 25, 2011, the contents of which are hereby incorporated by reference in their entirety.

FIELD OF THE INVENTION

The present invention relates to a method for recovering ammonium cation using $CO_2$ acidified absorption water which may in turn provide ammonia or ammonium compound product (as used herein, the term ammonia values means one or both of ammonia and ammonium compound).

BACKGROUND OF THE INVENTION

Ammonia values such as ammonia, ammonium carbonate and ammonium bicarbonate find many applications including, but not limited to, fertilizers and nutrients for metabolic processes. Numerous process streams contain ammonia values or nitrogen compounds that can yield ammonia values such as off gases from refining streams, syngas streams from steel manufacture, syngas from gasification of biomass, fermentation broths and solids, municipal and farm waste streams and the like. Advantageously these ammonia values are recovered for use where possible. A particularly attractive potential use for recovered ammonia values is in fermentation processes to supply nitrogen as a nutrient for the microorganisms.

For the recovery of ammonia values to be economically viable, the recovery processes should be cost effective and thus not only must the source of the ammonia values be available at a low cost, preferably as an existing disposal stream but also the capital and operating expenses for the recovery of the ammonia values must be relatively low. Additionally, the recovered ammonia values should be in a useable form. For instance, the product containing the ammonia values should not contain contaminants that would render the ammonia values unacceptable for their intended use. Where the product containing ammonia values is intended for use as a nitrogen nutrient for a fermentation process, the product should be substantially free of components deleterious to the microorganisms or cause an undesirable build-up of inert components in the fermentation process. Although the product containing ammonia values may be treated to remove such components, the additional unit operation adds to capital and operating costs.

Various flow schemes have been proposed to recover ammonia values from waste water that contains ammonium and ammonia. These processes generally involve raising the pH of the waste water to 9.0 or above, stripping the ammonia and then capturing it in an acidic scrubbing solution such as sulfuric acid (most common), hydrochloric acid or nitric acid. Conventional stripping towers, steam strippers, vacuum strippers and membrane systems (hollow fibers) have all been used at commercial and/or pilot scale.

Conventional methods for removal of ammonia, COS, and HCN from syngas prior to its use generally involves scrubbing with aqueous solutions to remove these compounds from the syngas with subsequent discharge of the scrubbing solutions to wastewater treatment or via alternate disposal methods.

Modern processes for ammonia removal include the water wash process in which the syngas is scrubbed by water, which dissolves the ammonia. The resulting scrubbing solution is pumped to an ammonia still where steam is used to strip out the ammonia. The ammonia vapors from the still can be processed to form ammonium sulfate, condensed to form a strong ammonia solution, incinerated or catalytically converted to nitrogen and hydrogen which are then recycled back into the gasifier.

Another process for ammonia removal from coke oven gas is the PHOSAM process developed by US Steel. This process absorbs the ammonia from the gas stream using a solution of monoammonium phosphate. The process produces saleable anhydrous ammonia, but operates at temperatures on the order of 50 degrees Celsius and pressures up to 190 psig (approximately 13 atmospheres of pressure gauge) in the stripper column. There is a need for a more robust and cost effective method for the treatment of syngas, particularly when used for biological transformation to useful liquid products such as ethanol, acetic acid or butanol.

Well known biological treatment processes used in concert with water based scrubbers can meet the objectives of high removal of ammonia, COS and HCN from syngas. Biological treatment processes can operate at atmospheric pressure and low temperatures without the excessive cost of expensive chemicals and operate without the generation of hazardous and/or toxic wastes. Biological treatment processing of ammonium, COS, and HCN absorbed into water from gas streams has been done before. Ammonia is, in general, removed using a slightly acidic or neutral pH scrubbing solution and this spent solution is sent to an aerobic wastewater treatment system where the ammonia is oxidized to nitrate and the nitrate subsequently reduced to nitrogen gas via denitrification, generally using an added organic electron donor such as methanol.

As generally described above ammonia may be removed from a system using a strong mineral acid such as hydrochloric acid (HCl) or sulfuric acid ($H_2SO_4$) to react with the alkaline ammonia, forming a solution containing an ammonium salt such as ammonium chloride ($NH_4Cl$) or ammonium sulfate (($NH_4$)$_2SO_4$). As this method requires the input of a strong acid to the system, there is an added expense for the cost of the chemicals and also the increased design requirements of any vessels, piping, hoses, and other chemical handling equipment so that these components can withstand the acidic environment. The ammonium salt may be used or sold as a concentrated solution or may be processed and removed from the system.

Large amounts of ammonia containing materials can result from the utilization of biomass to produce biofuels. Biofuels production for use as liquid motor fuels or for blending with conventional gasoline or diesel motor fuels is increasing worldwide. Such biofuels include, for example, ethanol and n-butanol. One of the major drivers for biofuels is their derivation from renewable resources by fermentation and bioprocess technology. One available technology path to convert lignocellulosic biomass to ethanol is to convert lignocellulosic biomass to syngas (also known as synthesis gas, primarily a mix of CO, $H_2$ and $CO_2$ with other components such as $CH_4$, $N_2$, $NH_3$, $H_2S$ and other trace gases) in a gasifier and then ferment this gas with anaerobic microorganisms to produce biofuels such as ethanol, propanol, n-butanol or chemicals such as acetic acid, propionic acid, butyric acid and the like. This technology path can convert all of the components to syngas with good efficiency (e.g., greater than 75%), and some strains of anaerobic microorganisms can convert syngas to ethanol, propanol, n-butanol or other chemicals with high (e.g., greater than 90% of theoretical) efficiency. Moreover, syngas can be made from many other carbonaceous feedstocks such as natural gas, reformed gas, peat, petroleum coke, coal, solid waste and land fill gas, making this a more universal technology path.

In the gasification of biomass, the preponderance of the nitrogen in the biomass is converted to ammonia. When the syngas is cooled and scrubbed to remove particulates and other contaminants, this ammonia is, to a large degree, removed in the scrubber/condensate flow stream. Treatment of this mass of ammonium requires a considerable sized waste water treatment system. If a significant fraction of this ammonium can be recovered for use in the fermentation itself and/or for export off site, a large savings in the capital and operating cost of waste water treatment can be realized, as little or no additional nitrogen needs to be purchased for the syngas fermentation and there may be the opportunity to market the remaining ammonium-nitrogen as a co-product.

These processes for the bioconversion of syngas to biofuels or biochemicals also provide a waste stream from the fermentation that contains microorganisms and other nitrogen containing compounds such as precipitated proteins. Recovery of ammonia values from this waste stream can be beneficial as the ammonia values may be recycled for use as a nitrogen source for supporting the fermentation or for other commercial value. In anaerobic digestion the biosolids in the waste stream are degraded and the cell nitrogen, proteins and other organic nitrogen-containing compounds converted to ammonia values. The higher the concentration of ammonia/ammonium produced, the higher the pH rises to because for each mole of ammonium formed a mole of alkalinity is concurrently formed. As the pH rises, significant amounts of non-ionized ammonia will be generated, in some cases high enough to cause inhibition of the anaerobic digestion process. In this situation additional water must be added to the digester to maintain the ammonia concentration below the threshold where the anaerobic digestion process is inhibited.

Methods are thus sought to recover ammonia values from waste streams, especially those generated in processes for making biofuels and biochemicals from syngas, which methods are economically attractive. Methods are sought for the anaerobic digestion of biosolids where the addition of water is not required to maintain the ammonia concentration below the threshold where the anaerobic digestion process is inhibited. Moreover, methods are sought that enhance the overall economics of processes for making biofuels and biochemicals from syngas.

SUMMARY OF THE INVENTION

By this invention, methods are provided that enable an effective recovery of ammonia values (ammonium cation and ammonia) from streams containing ammonia values without undue capital and operating expense and provide a product containing ammonia values that is in a form useable as an intermediate or final product, and, preferably, useable as a source of nitrogen for fermentation processes. The methods of this invention can use a wide variety of streams containing ammonia values from which to obtain ammonia values. In some preferred aspects of the invention, ammonia values are obtained from streams in processes in which the ammonia values are used such as fermentation processes. In preferred aspects of the invention, the methods of this invention can provide benefits to the process from which the waste stream is obtained.

In one aspect of the method of the present invention, summarized in its simplest form, a condensate stream from cleaning and cooling syngas containing the ammonia values (mostly present as ammonium since the $CO_2$ in the syngas neutralizes the alkalinity produced by dissociation of the ammonia absorbed into the water stream), is stripped using a suitable carrier gas, such as air, or using a vacuum In most cases, one or both of the pH and temperature in the selected contactor can be adjusted to increase the concentration of dissolved, non-ionized ammonia in the liquid to achieve greater stripping efficiency. The ammonia rich carrier gas is then contacted with a liquid rich in dissolved $CO_2$ in a scrubber/absorber. The ammonia is absorbed into this scrubbing solution and converted to predominantly the dissolved ammonium form, provided the pH is maintained at least one log unit more acidic than the pKa of ammonia at the temperature of the scrubbing solution. The scrubbing solution is maintained at this pH by cycling the scrubbing solution and contacting it with the tail gas from the fermentation process that will have between a 45% to 75%, preferably at least a 50%, mole fraction of $CO_2$. Overall it is possible to generate solutions of scrubber water that, depending on the purge rate and recycle rate, has anywhere from approximately 0.8% ammonium to approximately 14% ammonium for tail gas $CO_2$ concentrations of 45% and 75% mole fraction. Chilling the scrubber water to lower temperatures and, therefore increasing $CO_2$ solubility, will improve the maximum ammonium concentration that can be achieved in this solution, as would increasing the pressure in the scrubbing system.

Essentially the proposed method is a green technology. The recovered ammonium cation can be used in the anaerobic syngas fermentation as the nitrogen source and/or for reuse/sale off-site, or in the case of co-location with a corn ethanol facility, use in the yeast based fermentation as the nitrogen source. Since the ammonium is buffered by bicarbonate and carbonates formed from the dissolved $CO_2$, this solution can provide some of the alkalinity needed in the fermentation process itself. When mineral acids are used the alkalinity is not recovered.

The method of this invention is particularly beneficial when integrated with the production of liquid products from syngas. Of most interest in this invention are waste water streams from the treatment of syngas where the method of this invention was found to have unique benefits when incorporated into a syngas biofermentation process. One way to incorporate the methods of this invention in such fermentation arrangements uses a tail gas produced from fermentation, and any reject gas flows from $CO_2$ scrubbing and the like, that have a high mole fraction of $CO_2$ (generally 45% to 75% mole fraction). It is feasible to use dissolved $CO_2$, a relatively weak acid, in place of the typical mineral acids that are used for recovery of ammonia. The dissolved $CO_2$ solution can be generated by contacting the scrubber liquid used to recover ammonia with a stripping gas comprising the tail gas from the fermentation system and then recycling this liquid to capture ammonia stripped from the waste water. As a result no mineral acid is required for capturing the ammonium. This eliminates the need for the expense of the mineral acid and the need to maintain such acid on-site.

The instant invention is compatible with most of the ammonia stripping apparatus used in such processes, such as conventional strippers, vacuum strippers and membrane strippers, as mentioned above. It has recently been proposed to use hollow fibers for stripping, indicating it may be possible to achieve reasonable stripping efficiency without pH adjustment.

For use in syngas fermentation and/or use in a co-located corn to ethanol plant, this ammonia solution is suitable for use therein as is. Sale of the ammonium off-site would likely require the solution to be concentrated using reverse osmosis, electrodialysis, evaporation or other concentrating technology.

Accordingly in one embodiment this invention is a method for removing ammonia and or ammonium from an aqueous stream and recovering ammonium carbonate and ammonium bicarbonate. The method comprises the steps of adjusting the pH of a liquid solution comprising ammonium to convert ammonium in the solution to free ammonia and produce a converted solution and stripping ammonia from the converted solution in an ammonia stripping vessel to produce a gas phase stream containing ammonia. Contacting the ammonia-containing stream with a scrubbing liquid comprising dissolved $CO_2$ in a scrubbing vessel produces ammonium bicarbonate and ammonium carbonate. The method withdraws an ammonium liquid comprising ammonium carbonate and ammonium bicarbonate from the scrubbing vessel and recovers a first portion of the ammonium liquid as an ammonium product stream and recovers a second portion of the ammonium liquid by contact with a $CO_2$ containing gas stream and a make-up liquid to produce the scrubbing liquid.

In one more detailed embodiment the invention is a method for recovering ammonium carbonate and ammonium bicarbonate from an ammonium containing solution generated in the treatment and fermentation of biomass derived syngas. The method includes the steps of generating a raw syngas stream by the gasification of biomass. The method then cools and scrubs the raw syngas stream in a scrubber/cooler to generate a scrubbed syngas stream and a condensate stream containing volatile compounds and ammonium. The scrubbed syngas stream enters a fermentation zone to produce a fermentation product, a tail gas stream comprising $CO_2$, and a biosolids stream. The biosolids stream passes to a digester to decompose the biosolids and recover an ammonium containing solution from the digester. Removing volatile compounds from the condensate stream by stripping or other means such as adsorption generates a scrubbed condensate stream containing ammonium. At least a portion of the scrubbed condensate stream and the ammonium containing solution passes to an ammonia stripping vessel that maintains the pH in the ammonia stripping vessel at least one log unit more basic (at least one log unit below) than the pKa of ammonia at the temperature in the stripping vessel to maintain free ammonia in the ammonia stripping vessel. The pKa of ammonia can be adjusted by one or both of pH and temperature change. Stripping ammonia from the ammonia stripping vessel with a stripping gas stream produces an ammonia-containing gas stream. Contacting the ammonia-containing gas stream with an ammonia scrubbing liquid comprising dissolved $CO_2$ in a scrubbing vessel produces ammonium bicarbonate and ammonium carbonate that is withdrawn from the scrubbing vessel as an ammonium liquid comprising ammonium bicarbonate and ammonium carbonate. A first portion of the ammonium liquid is recovered as an ammonium product stream and at least a portion of the ammonium product stream returns to the fermentation zone. Contacting a second portion of the ammonium liquid with the tail gas stream and a make-up liquid in a gas contacting vessel produces the ammonia scrubbing liquid comprising dissolved $CO_2$.

Another aspect of the invention broadly relates to methods for recovery of ammonium values from anaerobic digestion of solid-containing waste from fermentation processes comprising:

a. anaerobically digesting at least a portion of said solid-containing waste in an aqueous digestion liquor to generate ammonia or ammonium;

b. passing through the aqueous digestion liquor a gas comprising greater than 50, preferably greater than 60, volume percent carbon dioxide in an amount sufficient to maintain the pH of the aqueous digestion liquor below that where ammonia unduly inhibits the anaerobic digestion, preferably about 7, and sometimes between about 6.5 to 7.5 and generate a scrubbed gaseous stream; and c. recovering ammonia from the aqueous digestion liquor.

Preferably the method is continuous and the gas containing carbon dioxide is continuously or intermittently introduced into an anaerobic digester containing the aqueous digestion liquor. An aliquot portion of the aqueous digestion liquor is continuously or intermittently removed from the anaerobic digester and ammonia is recovered from that portion of the aqueous digestion liquor. In a preferred embodiment of this aspect of the invention, the gas containing the carbon dioxide also contains hydrogen and carbon monoxide and the anaerobic digestion bioconverts at least a portion of the hydrogen and carbon dioxide and at least a portion of the hydrogen and carbon monoxide to methane to provide a scrubbed gaseous stream having a greater energy density than the gas provided to the anaerobic digestion. In another preferred embodiment of this aspect of the invention, the amount of water in the aqueous digestion liquor is less than that required to avoid inhibition of the anaerobic digestion in the absence of the contact with the gas containing carbon dioxide. If desired, additional nitrogen-containing wastes can be supplied to step (a) to increase the amount of ammonia that can be recovered. This mode of operation may be advantageously used where substantially all the nitrogen required for the fermentation is generated by the anaerobic digestion of step (a).

Another aspect of the invention broadly relates to improvements in fermentation processes for the anabolic bioconversion of a substrate in an aqueous fermentation broth containing microorganisms, said processes generating solid waste, comprising:

a. anaerobically digesting at least a portion of said waste solids in an aqueous digestion liquor to generate ammonia or ammonium and carbon dioxide and provide a digestion liquor containing ammonia, ammonium carbonate and ammonium bicarbonate;

b. providing the digestion liquor at a pH and temperature sufficient to convert at least a portion of ammonium in the liquor to free ammonia and provide a converted liquor;

c. stripping ammonia from the converted liquor in an ammonia stripping vessel to produce a gas phase ammonia stream; and d. using directly or indirectly at least a portion of the gas phase ammonia stream as a source of nitrogen for the anabolic fermentation.

Preferably, step (b) comprises making the pH of the digestion liquor more basic by stripping carbon dioxide from the digestion liquor. In more preferred embodiments of the invention, the temperature of the digestion liquor in step (b) is increased to reduce the pKa of ammonia.

DETAILED DESCRIPTION OF THE INVENTION

Figure 1:
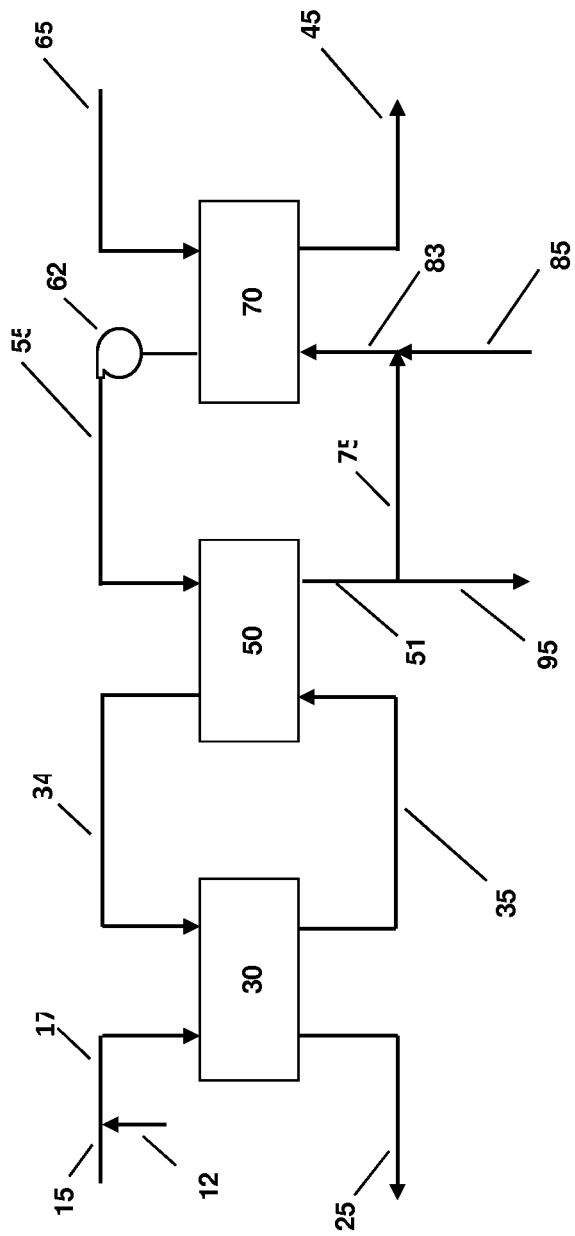
FIG. 1 is a block diagram showing the method of the present invention in its simplest form and including stripping and recovery of ammonium from syngas scrubbing using a $CO_2$ rich gas stream to absorb ammonium stripped from an ammonium rich stream, such as a syngas scrubber stream, with pH or temperature adjusted to provide sufficient non-ionized ammonia to effectively strip ammonia in a conventional stripper system.

For purposes herein, the following terms have the meanings set forth.

Ammonium means ammonium ion.

Anabolic bioconversion of a substrate means the metabolic conversion by a microorganism of carbon-containing substrate, including, but not limited to carbon monoxide, carbon dioxide and hydrogen, hydrocarbons, carbohydrates and other oxygenated hydrocarbons, under aerobic or anaerobic fermentation conditions to oxygenated organic compound.

Oxygenated organic compound means one or more organic compounds containing two to six carbon atoms selected from the group of aliphatic carboxylic acids and salts, alkanols and alkoxide salts, and aldehydes. Often oxygenated organic compound is a mixture of organic compounds produced by the microorganisms contained in a fermentation broth.

Syngas is a gas containing carbon monoxide and frequently hydrogen, although term "syngas", for purposes herein, is also intended to encompass carbon monoxide gas streams that may have little or no hydrogen. Typically, carbon monoxide is present in an amount of at least about 20 volume percent, and the syngas typically contains other components in addition to hydrogen such as carbon dioxide, nitrogen and water vapor. Syngas may be derived from various sources, including, but not limited to, gasification of carbonaceous feedstocks such as biomass, landfill gas, coal, natural gas, and petroleum; coke oven gas and gas from other industrial operations such as petroleum refining and steel mill waste gas.

This invention may any be used to treat any aqueous stream that contains large amounts of ammonia or ammonium. Useful input streams for the practice of this invention will typically have a combined concentration of ammonia and ammonium of greater than 0.1 to 1.0 wt. %. Substantial amounts of ammonium carbonate and ammonium bicarbonate may be present in the feed stream.

Stripping of the ammonia stream from the aqueous input stream ordinarily takes place in an ammonia stripping vessel. With adjustment of at least one of the pH and temperature, stripping of the input stream will yield the gas stream containing primarily ammonia and any other volatile compounds that are not removed by pretreatment of the input stream. In general, increasing temperature will result in decreasing the pKa of ammonia. To maintain large amounts of free ammonia, the stripping vessel is usually kept at least at the pH, and preferably at least one log unit more basic than, the pKa of ammonia at the temperature of the stripping vessel to convert ammonium in the solution and produce a high concentration of ammonia in the converted solution so that the mole fraction of ammonia in the converted solution exceeds the mole fraction of ammonium.

Ammonia may be recovered from the stripping vessel in any manner that brings gas phase ammonia into intimate contact with a scrubbing liquid containing dissolved $CO_2$. The pH of the scrubbing liquid is typically adjusted to 8.0 or lower. The dissolved $CO_2$ is typically maintained at an equilibrium concentration in the scrubbing liquid with the $CO_2$ mole fraction in the tail gas. Higher concentrations of dissolved $CO_2$ may be obtained by chilling and/or pressurizing the scrubbing liquid to change the equilibrium concentration. The contacting of the scrubbing liquid may take place in a scrubbing vessel that provides a large volume for direct contacting and mixing of the streams.

Alternatively vacuum stripping may draw a gas phase ammonia stream out of the ammonia stripping vessel. An eductor device that uses the scrubbing liquid as the motive fluid may simultaneously draw the ammonia out of the stripping vessel while also in conjunction with the associated piping may act as a scrubbing vessel to promote intimate mixing of the ammonia gas and the scrubbing liquid. Those skilled in the art are aware of other methods to withdraw ammonia gas from the stripping vessel and mix the scrubbing liquid therewith. Such methods can use membrane systems with various pressure control and contactors that will act as scrubbing vessels for mixing the ammonia with the dissolved $CO_2$.

The $CO_2$ of the scrubbing solution reacts with the ammonium to produce ammonium carbonate and ammonium bicarbonate in an ammonium liquid. A portion of the ammonium liquid can be used as a product stream. In the case of an integrated biofermentation process the ammonium liquid is part of the process flow that provides ammonium to the fermentation zone. Through the buffering of the carbonate and bicarbonate the ammonium can provide some of the alkalinity needed in the fermentation zone.

In another aspect of the invention, at least a portion of the ammonium rich solution is passed to a concentrator to form a concentrated ammonia product. Any known concentrating mechanism may be used. The concentrated ammonia product may then be sold as a raw material for other processes which require ammonia, sold for use as a fertilizer, or used in another process co-located at a facility which includes the process described in this disclosure.

Another portion of the ammonium liquid passes to a $CO_2$ absorption vessel where it is combined with a make-up water stream and contacted with a $CO_2$ containing gas stream to provide additional scrubbing liquid. The scrubbing solution will usually comprise water which is constantly replenished with make-up water to replace ammonium liquid withdrawn for product use. The $CO_2$ gas stream that contacts the scrubbing water and the ammonia liquid will usually have a $CO_2$ mole fraction that is greater than 40%.

Of most interest in this invention are waste water streams from the treatment of syngas where the process of this invention was found to have unique benefits when incorporated into a syngas biofermentation process. A variety of gasification processes are known for the production of syngas from various carbonaceous materials. The syngas is produced by gasifying biomass in a gasifier. "Biomass" as used in this application means organic solid material including municipal solid waste. Examples of material that would be considered biomass under this definition include, but are not limited to: corn, corn stalks, sugarcane, bagasse, wood, sawdust, paper, cardboard, cotton, cotton fiber, leaves, and municipal solid waste. Any process of gasifying the biomass to syngas may be used.

Once gasified, the biomass is converted to a syngas effluent stream comprising carbon monoxide, carbon dioxide, hydrogen, ammonia, and particulates. This syngas effluent stream is then scrubbed by contacting with a scrubber liquid, typically comprising water, to form a scrubbed gas stream and the scrubber condensate stream comprising ammonia and ammonium that serves as the previously described input stream. In addition, the syngas will often contain dissolved volatile compounds including hydrocarbons, COS and HCN. The syngas will typically undergo scrubbing for the removal of these compounds with the scrubber liquid. The scrubber liquid may undergo gas stripping, contact with activated carbon, or other treatment to remove HCN and volatile compounds before adjusting the pH of the syngas scrubber liquid. The scrubber may also serve as a cooler to reduce the temperature of the syngas stream. The scrubbed gas stream from the scrubber or scrubber/cooler is passed to the fermentation broth in a fermentation zone which comprises microorganisms to form liquid products and a carbon dioxide rich gas. Any suitable microorganisms may be used.

In some processes it is advantageous to keep the fermentation zone at a neutral or alkaline pH. An advantage of the present invention is that ammonia is more readily soluble in water than many calcium-containing alkaline materials, and thus ammonia and ammonium are easier to pass to the various components of the present invention. The recycling of at least a portion of the ammonium rich solution to the fermentation zone can also add nitrogen to provide the cellular maintenance and growth needs of the microorganisms. Often most, and in some instances all, of the nitrogen required for the fermentation can be provided by the processes of this invention.

The use of microorganisms for bioconversions of CO and $H_2/CO_2$ to acetic acid, ethanol, and other products are well known. For example, in a recent book concise description of biochemical pathways and energetic of such bioconversions have been summarized by Das, A. and L. G. Ljungdahl, *Electron Transport System in Acetogens* and by Drake, H. L. and K. Kusel, *Diverse Physiologic Potential of Acetogens*, appearing respectively as Chapters 14 and 13 of Biochemistry and Physiology of Anaerobic Bacteria, L. G. Ljungdahl eds., Springer (2003). Any suitable microorganisms that have the ability to convert the syngas components CO, $H_2$, $CO_2$ individually or in combination with each other or with other components that are typically present in syngas may be utilized. Suitable microorganisms and/or grown conditions may include those disclosed in U.S. patent application Ser. No. 11/441,392, filed May 25, 2006, entitled "Indirect Or Direct Fermentation of Biomass to Fuel Alcohol," which discloses a biologically pure culture of the microorganism *Clostridium carboxidivorans* having all of the identifying characteristics of ATCC no. BAA-624; and U.S. patent application Ser. No. 11/514,385 filed Aug. 31, 2006 entitled "Isolation and Characterization of Novel Clostridial Species," which discloses a biologically pure culture of the microorganism *Clostridium ragsdalei* having all of the identifying characteristics of ATCC No. BAA-622; both of which are incorporated herein by reference in their entirety. *Clostridium carboxidivorans* may be used, for example, to ferment syngas to ethanol and/or n-butanol. *Clostridium ragsdalei* may be used, for example, to ferment syngas to ethanol.

DESCRIPTION OF THE PREFERRED EMBODIMENT(S)

Referring now to the drawings in greater detail, there is illustrated in FIG. 1 a block diagram of one aspect of the process of the present invention. As shown, a stream 15 rich in ammonium, from a source, such as a syngas condensate stream, is combined with a caustic agent 12, such as NaOH or other alkali, to adjust the pH upward such that most of the ammonia is present as non-ionized or free ammonia. In addition, or alternatively, the temperature of stream 15 can be increased. This combined stream 17 is sent to stripping tower 30, where it is contacted with a gas stripping stream 34 that is lean in ammonia concentration and recycled to the stripping tower 30 from an ammonia absorption vessel 50. A scrubbed water stream 25, that has a significantly reduced ammonium concentration, is discharged from stripping tower 30 and sent to waste water treatment while an ammonia rich gas stripping stream 35, which results from stripping the ammonia from stream 25, is sent to the ammonia scrubbing tower 50 for recovery or capture of the ammonia.

In the ammonia scrubbing tower 50, gas stream 35 is contacted with a $CO_2$ rich ammonia absorption liquor stream 55 and a significant proportion of the ammonium is absorbed into the liquor from stream 35. Tower 50 discharges an ammonia lean gas stream as gas stripping stream 34 back to the ammonia stripper tower 30. The absorption liquor discharged from the scrubbing tower 50 via line 51, now rich in dissolved ammonium bicarbonate and ammonium carbonate formed through a reaction between the ammonia and the $CO_2$, is split with a first portion 95 discharged for use at the site or sale off site and a second portion 75 being sent back to a $CO_2$ absorption column 70, where the concentration of dissolved $CO_2$ is replenished. Make-up water stream 85 is added to the $CO_2$ absorption column 70 in combination with the second portion 75 via a combined stream 83 to maintain the volume lost by purging of first portion 95.

In the $CO_2$ absorption column 70, a $CO_2$ rich gas stream 65 is contacted with combined stream 83 to replenish the concentration of dissolved $CO_2$. Combined stream 83 contains the combined flows of make-up water 85 and the second portion 75 of liquor from the ammonium scrubbing tower 50. The $CO_2$ rich ammonia absorption liquor stream 55 is then provided to the scrubbing tower 50 using pump 62. Exit gas 45 from the $CO_2$ absorption column 70 is treated as appropriate and then discharged to the atmosphere.

Figure 2:
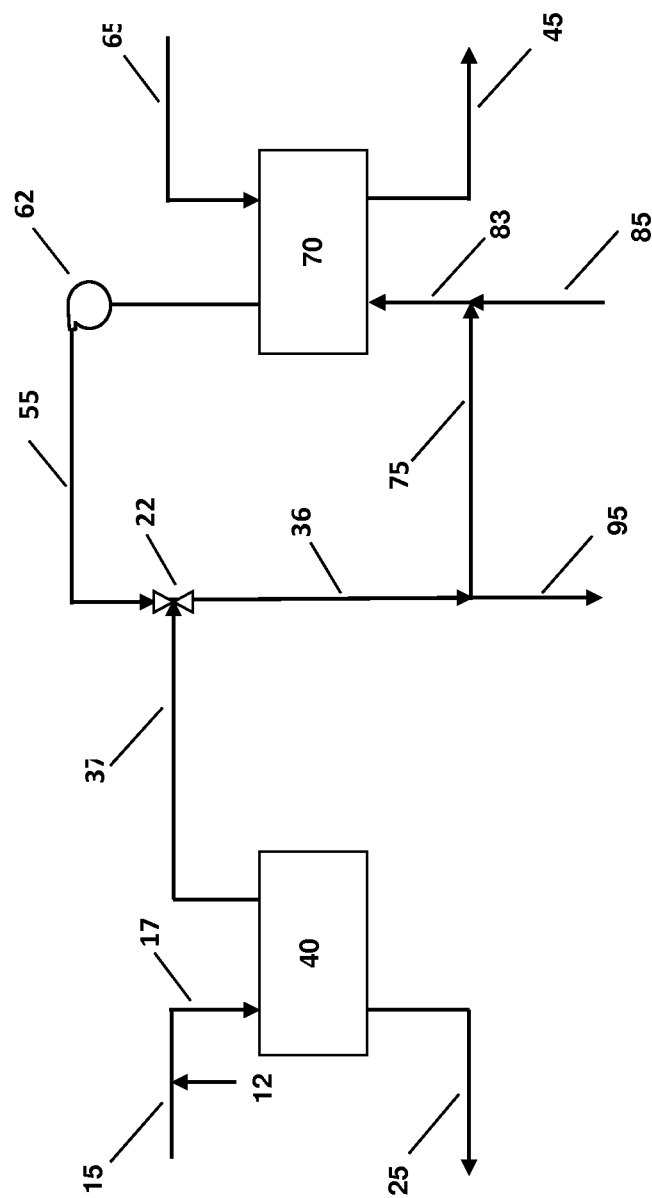
FIG. 2 is a block diagram of another embodiment of the present invention that shows use of a flash vacuum stripper in place of a conventional gas stripper. No gas stripping stream is required with this approach.

In FIG. 2, instead of using an ammonia scrubbing tower 50 and a circulating scrubbing gas to carry the ammonia to an ammonium scrubbing tower as in FIG. 1, the $CO_2$ rich ammonium absorption liquor stream 55 from $CO_2$ absorption column 70 runs through a venturi device 22 that pulls a vacuum to draw out ammonium rich overhead gas from a vacuum vessel 40. Line 37 transfers the ammonia from the vacuum vessel 40 into the venturi device 22 where it contacts stream 55. Absorption of the ammonia forms ammonium bicarbonate and ammonium carbonate taken by stream 36 and split into the second portion 75 for return to the $CO_2$ absorption column 70 and the first portion 95 recovered as product for use or sale offsite. Any non-condensable gases in line 37 are carried into the $CO_2$ absorption column 70 where they are released with the appropriately treated exit gas 45. In the $CO_2$ absorption column 70, the $CO_2$ rich gas stream 65 contacts the combined stream 83, that contains make-up water 85 and returned ammonium bicarbonate and carbonate from second portion 75 to replenish the concentration of dissolved $CO_2$. Pump 62 returns the $CO_2$ rich ammonia absorption liquor stream 55 to the venturi device 22.

Figure 3:
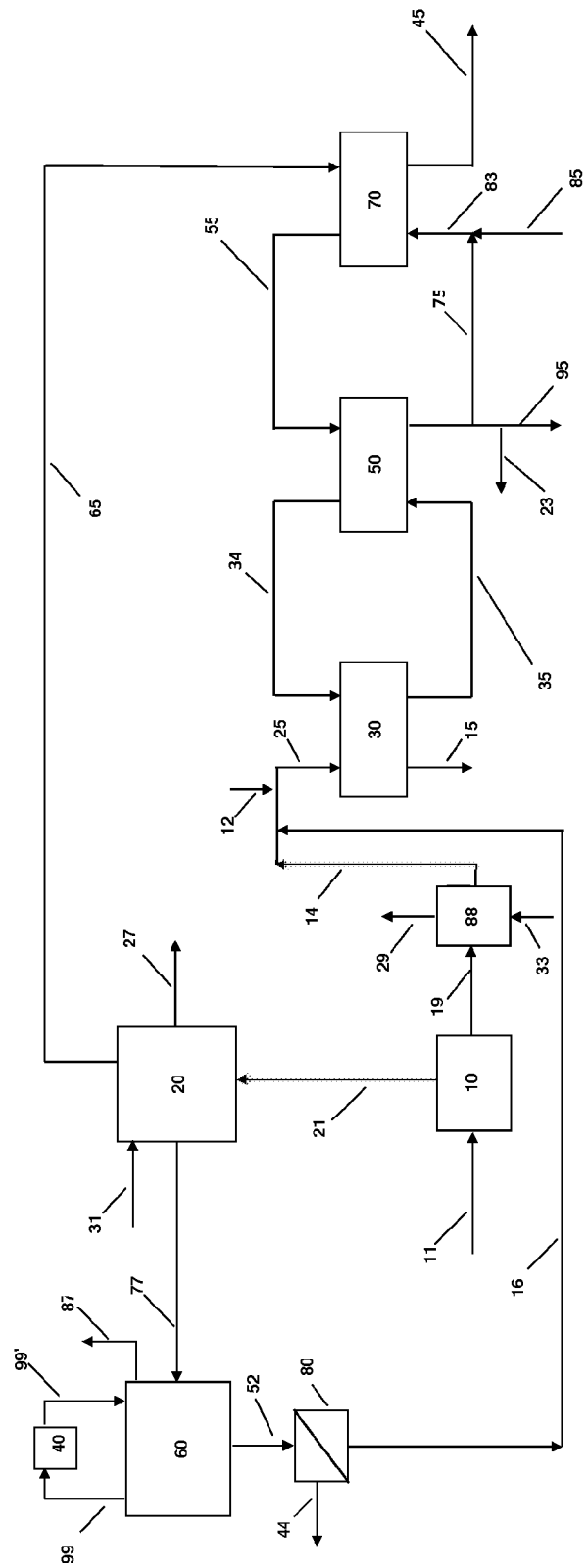
FIG. 3 is a block diagram of another embodiment of the present invention showing an integrated system where the ammonium rich stream is a combination of syngas stripper condensate and effluent from a digester for destruction of excess biosolids produced in fermentation and the $CO_2$ rich stream used to recover the ammonium is the $CO_2$ rich tail gas from said fermentation system.

FIG. 3 shows the process of the instant invention integrated with the steps for the fermentation of syngas into soluble products such as ethanol, propanol, butanol or acetate, propionate or butyrate. Note that, although shown for a syngas based fermentation, this further embodiment of the process of the present invention is applicable for any fermentation system where a tail or off-gas rich in $CO_2$ is produced and the fermentation process utilizes a source of nitrogen.

FIG. 3, incorporates the ammonia recovery arrangement depicted in FIG. 1 into its overall embodiment. In this case a combination of several streams that have high ammonium, a syngas scrubber stream carried by a line 14 and a waste water stream 16, are sent to ammonia recovery.

In this arrangement a fermentation vessel 20 delivers excess biosolids 77 for digestion in digester 60. Digester 60 may be an anaerobic digester or aerobic digester and may be equipped with a device 40 that manages excess biosolids 77 by grinding or other means that enhance degradation. Streams 99 and 99' transfer biosolids to and from device 40. Note that although shown as an internal recycle in FIG. 3, using device 40 as a pretreatment or post treatment device is also possible. Digester 60 discharges the bulk of the total suspended solids (TSS) to a separation device 80 that produces a concentrated solids stream 44 and waste water stream 16 which is low in suspended solids and rich in nutrients including ammonia.

Line 11 introduces raw syngas into a direct contact scrubber/cooler 10 for condensing and cooling. Line 21 carries cleaned syngas to fermentation vessel 20 while a condensed scrubber water stream passes via line 19 to a stripper 88.

In stripper 88 a stripping gas stream 33 removes dissolved hydrocarbons that exit as gas stream 29. Gas stream 29 is managed to utilize the energy content of the stripped hydrocarbons in the gas. The remainder of the scrubber water, now high in ammonium leaves stripper 88 via line 14.

A condensate stream 25, formed by combining scrubber stream from line 14 with waste water stream 16, has high ammonia content due to biological digestion of the excess biosolids 77 produced during fermentation. The condensate stream 25, now pH adjusted by the addition of a caustic agent from line 12 and at a higher temperature, passes to passes ammonia stripping tower 30. Note that stream 25 can be sent through pretreatment to remove suspended solids and/or dissolved, non-condensable gases prior to ammonia stripping if desired.

Condensate stream 25 passes to the stripping tower 30 for recovery of ammonia which passes to scrubbing tower 50 production and recovery of ammonium carbonate and ammonium bicarbonate as previously described. A portion of the ammonium bicarbonate and ammonium carbonate that leaves scrubbing tower 50 passes to the fermentor 20 via line 23 as nitrogen input.

Fermentation vessel 20 passes the cleaned syngas from line 21 into contact with anaerobic microorganisms. The microorganisms consume the syngas and as part of their metabolic processes and excrete liquid products, such as ethanol. Nitrogen in the form of ammonium from scrubber liquid from line 23 enters fermentor 20 through line 31 along with fresh fermentation media. Line 27 recovers ethanol produced by the fermentor 20. A tail gas stream rich in $CO_2$ passes from fermenter 20 via line 65 to supply $CO_2$ to absorption column 70.

For purposes of further description a 20 million gallon per year syngas to ethanol plant is used as a calculated example of the instant invention. The raw syngas stream is cooled and scrubbed resulting in a condensate stream that has approximately 630 pounds/day of ammonium as nitrogen. Approximately 1,620 pounds/day of ammonium as nitrogen is added to the syngas fed fermenters to provide the necessary nitrogen for good cell growth. The combined purge flows from the fermentation system contain 160 pounds/day of ammonium as nitrogen and 1,460 pounds/day of organic nitrogen, primarily cell biomass plus some soluble proteins formed during the fermentation process. The fermentation purge flows are forwarded to an anaerobic digestion (AD) system equipped with a device to shear the biomass and enhance the degradation of the excess biomass wasted from fermentation. The effluent stream from the anaerobic digestion process after the solids are removed via centrifugation, membrane filtration and/or other applicable unit operation contains approximately 1,330 pounds/day of ammonium as nitrogen and an additional 130 pounds/day of organic nitrogen. This results in a combined stream of scrubber condensate and aerobic digester concentrate of 1,960 pounds/day of ammonium as nitrogen and 130 pounds of organic nitrogen that is sent to an ammonium stripping/recovery unit. The tail gas stream from the fermentation process provides a stream rich in $CO_2$ that passes to the absorption column of the stripping recovery unit to provide the ammonia scrubbing liquid. The stripping system recovers 85% of the ammonium as ammonium bicarbonate and ammonium carbonate or 1,670 pounds/day. Of this, 1,620 pound/day of the ammonium is recycled back to the fermentation process. The remainder of the ammonium is available for sale off-site as a fertilizer product, disposed of off-site or simply wasted along with the remaining ammonium and organic nitrogen in the stripper bottoms to the wastewater treatment plant.

Figure 4:
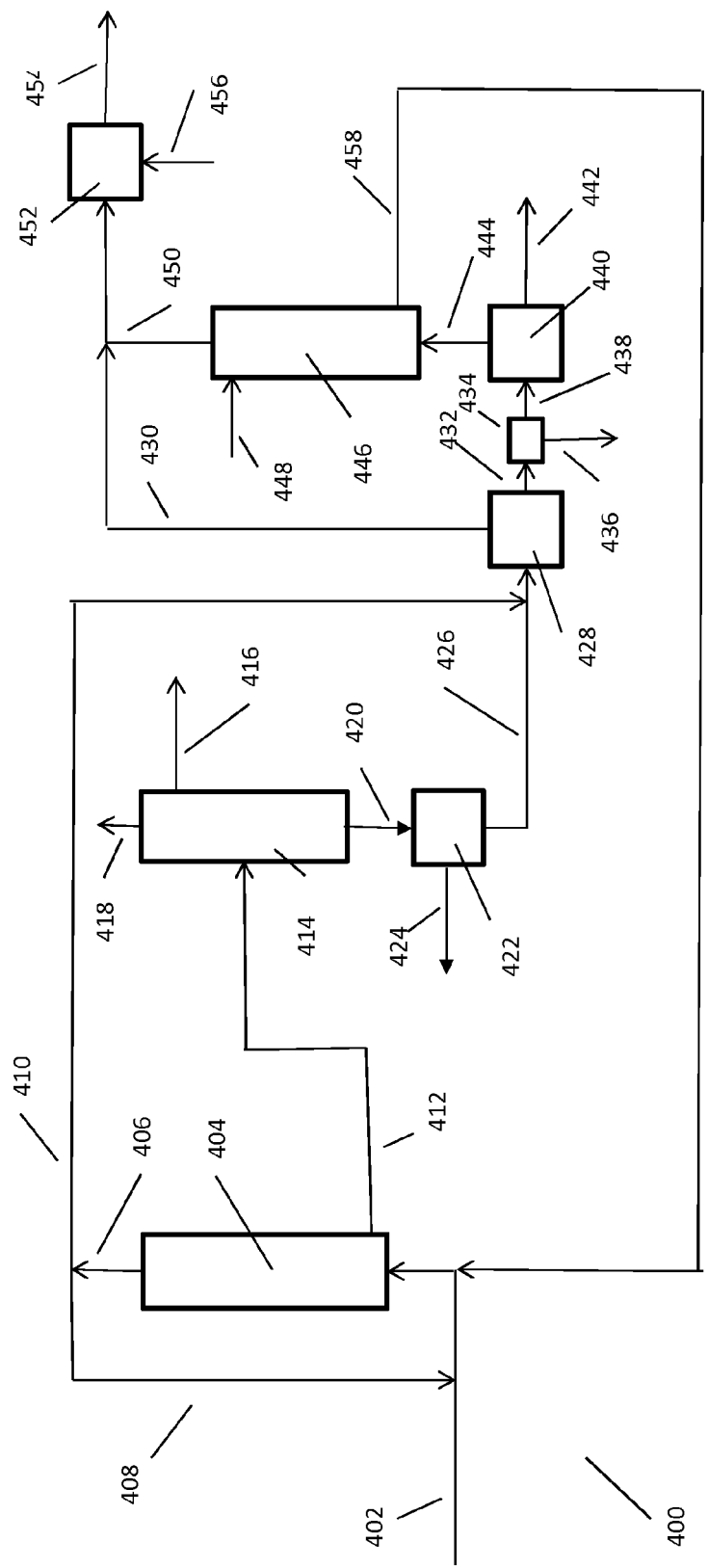
FIG. 4 is a block diagram of another embodiment of the invention showing an integrated system for anaerobic bioconversion of syngas to oxygenated organic compound.

With reference to FIG. 4, apparatus 400 is depicted for the conversion of syngas to oxygenated organic compound. For purposes of explanation, the oxygenated organic compound is ethanol, although it is to be understood that the process is applicable to the production of other compounds such as propanol and butanol.

Syngas is provided via line 402 to anaerobic fermentation vessel 404 containing microorganisms in an aqueous fermentation broth for bioconversion of syngas to ethanol. Off gases from vessel 404 are withdrawn via line 406 and a portion is passed into line 408 for recycle to vessel 404 and the remaining portion is conveyed by line 410 as tail gas. These off gases contain unreacted syngas, methane, carbon dioxide, nitrogen, and water vapor.

Fermentation vessel 404 is operated on a continuous basis and a portion of the fermentation broth is withdrawn via line 412. The withdrawn fermentation broth contains ethanol and also microorganisms and solid debris from the microorganisms and is passed to ethanol recovery assembly 414 which also may comprise one or more unit operations including a distillation column. Product ethanol is withdrawn from ethanol recovery assembly via line 416 and light gases are exhausted via line 418. A bottoms stream containing water and solids is withdrawn from ethanol recovery assembly 414 (e.g., as a still bottoms stream) via line 420 and passed to solids separation assembly 422 which may comprise one or more unit operations to effect the separation such as centrifuges, hydrocyclones, decanters, and the like. A clear liquid is withdrawn from solids separation assembly 422 via line 424 which may be sent to wastewater treatment or a portion may be returned to fermentation vessel 404.

A biosolids-containing slurry is withdrawn from solids separation assembly 422 via line 426 and passed to anaerobic digester 428 for catabolic degradation of the biosolids with the production of ammonium ion and carbonate and bicarbonate anion. If desired, mechanical diminution of the biosolids may be conducted to facilitate the catabolic degradation. If desired, additional nitrogen-containing wastes may be supplied to anaerobic digester 428 to increase the amount of production of ammonia. Suitable nitrogen-containing wastes include, but is not limited to, food wastes, whey or other high strength waste streams. Tail gas is provided by line 410 to anaerobic digester 428 as a source of carbon dioxide. The mole fraction of carbon dioxide in the tail gas can be greater than about 40, preferably greater than 50, often between about 60 and 70, volume percent. The carbon dioxide tends to make the liquid in anaerobic digester 428 more acidic and thereby reduce the dissolved, free ammonia in the liquid and maintain the non-ionized ammonia concentration below that which can cause inhibition of the anaerobic digestion without the need to add dilution water.

Gases not retained in the liquid phase in anaerobic digester are exhausted via line 430. These gases have a reduced concentration of hydrogen, carbon dioxide and carbon monoxide as compared to the tail gas in line 410 because the anaerobic digestion process can effect conversion of hydrogen and carbon dioxide and hydrogen and carbon monoxide to methane. Thus, these gases will have a greater concentration of methane and as a result a greater energy density.

The liquid and solid mass from anaerobic digester 428 is passed via line 432 to solids separator 434 where solids are removed via line 436 for landfill or further waste treatment and the supernatant liquid containing ammonium ion is passed to ammonia stripper 440. The pH of the supernatant liquid in ammonia stripper 440 is adjusted to be more basic than pKa of ammonia at the temperature of the supernatant liquid to provide an off gas containing ammonia and carbon dioxide and a stripped liquid which is removed via line 442. The off gas is passed via line 444 to ammonia scrubber 446. Water is provided to ammonia scrubber via line 448 as the scrubbing solution. The scrubbing solution may contain carbon dioxide, e.g., from scrubbing the gases emitted from anaerobic digester 428. The scrubbed gases exit ammonia scrubber 446 via line 450 and are combined with the gases in line 430 from anaerobic digester 428. The gases are passed to thermal oxidizer 452 to generate heat. Natural gas via line 456 can be provided, if necessary, to the thermal oxidizer 452 to provide any additional heat values required to obtain effective thermal oxidation. As the gases from anaerobic digester 428 have increased energy density, the natural gas addition may not be required, and if required, would be at a lesser rate than if the tail gas were directly fed to thermal oxidizer 452. Combustion gases exit thermal oxidizer 452 via line 454.

The spent scrubbing solution in ammonia scrubber 446 contains ammonium carbonate and ammonium bicarbonate and is passed via line 458 for recycle to fermentation vessel 404 as nitrogen nutrient for the microorganisms.

As described, the present invention provides a number of advantages, some of which have been described above and others which are inherent in the invention. Also, modifications may be proposed without departing from the teachings herein. Accordingly, the scope of the invention is only to be limited as necessitated by the accompanying claims.

The invention claimed is:

1. A method for recovering ammonium carbonate and ammonium bicarbonate from a liquid solution comprising at least one of ammonia or ammonium, the process comprising the steps of:
   a. providing the liquid solution comprising ammonium at a pH and temperature sufficient to convert at least a portion of ammonium in the solution to free ammonia and provide a converted solution;
   b. stripping ammonia from the converted solution in an ammonia stripping vessel to produce a gas phase ammonia stream;
   c. contacting the ammonia stream with a scrubbing liquid comprising dissolved $CO_2$ in a scrubbing vessel to produce ammonium bicarbonate and ammonium carbonate;
   d. withdrawing an ammonium liquid comprising ammonium carbonate and ammonium bicarbonate from the scrubbing vessel;
   e. recovering a first portion of the ammonium liquid as an ammonium product stream; and
   f. contacting a second portion of the ammonium liquid with a $CO_2$ containing gas stream and a make-up liquid to produce the scrubbing liquid.

2. The method of claim 1 wherein the liquid solution comprises an anaerobic digestion liquor.

3. The method of claim 2 wherein the liquid solution comprises anaerobic digestion liquor from the catabolic degradation of solids obtained from a fermentation of syngas to produce oxygenated organic compound.

4. The method of claim 1 where the $CO_2$ mole fraction of the $CO_2$ containing gas stream is greater than 40%.

5. The method of claim 1 where a vacuum stripper strips ammonia from the converted solution.

6. The method of claim 1 where a membrane distillation system strips ammonia from the converted solution.

7. The method of claim 1 where the $CO_2$-containing gas is a tail gas from a fermentation process.

8. The method of claim 7 wherein a portion of the ammonium rich liquid passes to the fermentation process.

9. The method of claim 1 wherein a gas phase stripping stream strips ammonia from the converted solution.

10. The process of claim 1 wherein the pH of the scrubbing liquid is adjusted to 8.0 or lower.

11. The method of claim 1 wherein the mole fraction of ammonia exceeds the mole fraction of ammonium in the converted solution.

12. The method of claim 1 wherein the pKa in the ammonia stripping vessel is at least one log unit more basic than the pKa of ammonia at the temperature of the stripping vessel.

13. A method for recovering ammonium carbonate and ammonium bicarbonate from an ammonium containing solution generated in the treatment of biomass derived syngas, the process comprising the steps of:
   a. generating a syngas stream by the gasification of biomass;
   b. scrubbing at least a portion of the syngas stream in a syngas scrubber to generate a syngas scrubbing liquid containing ammonium and a scrubbed syngas stream;
   c. passing the scrubbed syngas stream to a fermentation zone to produce a fermentation product and a tail gas stream comprising $CO_2$;
   d. passing the syngas scrubbing liquid to an ammonia stripping vessel and adjusting at least one of the pH and temperature in the ammonia stripping vessel such that the pH is the same as or is more basic than the pKa of ammonia at the temperature in the ammonia stripping vessel to maintain free ammonia in the ammonia stripping vessel;
   e. stripping ammonia from the ammonia stripping vessel with a stripping gas stream to produce an ammonia gas stream;
   f. contacting the ammonia gas stream with an ammonia scrubbing liquid comprising dissolved $CO_2$ in a scrubbing vessel to produce an ammonium liquid comprising ammonium bicarbonate and ammonium carbonate;
   g. recovering a first portion of the ammonium liquid as an ammonium product stream;
   h. passing a second portion of the ammonium liquid into contact with the tail gas stream and a make-up liquid in a gas contacting vessel to produce the ammonia scrubbing liquid.

14. The method of claim 13 wherein the fermentation zone produces biosolids as a by-product, the biosolids are decomposed in a digester, and an ammonium containing waste stream is recovered from the digester and passed to the ammonia stripping vessel.

15. The method of claim 13 wherein a portion of the ammonium liquid passes to the fermentation process to provide a source of nitrogen for microorganisms contained therein.

16. The method of claim 14 wherein the syngas contains dissolved volatile compounds including HCN, the syngas scrubbing liquid comprises water, and the syngas scrubbing liquid is treated by at least one of air stripping or contact with activated carbon adsorption to remove HCN and volatile compounds before adjusting at least one of the pH and temperature of the syngas scrubbing liquid.

17. A process for recovering ammonium carbonate and ammonium bicarbonate from an ammonium containing solution generated in the treatment and fermentation of biomass derived syngas, the process comprising the steps of:
  a. generating a raw syngas stream by the gasification of biomass;
  b. cooling and scrubbing the raw syngas stream to generate a scrubbed syngas stream and a condensate stream containing volatile compounds and ammonium;
  c. passing the scrubbed syngas stream to a fermentation zone to produce a fermentation product, a tail gas stream comprising $CO_2$, and a biosolids stream;
  d. passing the biosolids to a digester to decompose the biosolids and recover an ammonium containing solution from the digester;
  e. removing volatile compounds from the condensate stream to generate a scrubbed condensate stream containing ammonium;
  f. passing at least a portion of the scrubbed condensate stream and the ammonium containing solution to an ammonia stripping vessel and maintaining the pH in the ammonia stripping vessel at least one log unit more basic than the pKa of ammonia at the temperature in the stripping vessel to maintain free ammonia in the ammonia stripping vessel;
  g. stripping ammonia from the ammonia stripping vessel with a stripping gas stream to produce an ammonia gas stream;
  h. contacting the ammonia gas stream with an ammonia scrubbing liquid comprising dissolved $CO_2$ in a scrubbing vessel to produce ammonium bicarbonate and ammonium carbonate;
  i. withdrawing an ammonium liquid comprising ammonium bicarbonate and ammonium carbonate from the scrubbing vessel;
  j. recovering a first portion of the ammonium liquid as an ammonium product stream and passing at least a portion of the ammonium product stream to the fermentation zone; and,
  k. contacting a second portion of the ammonium liquid with the tail gas stream and a make-up liquid in a gas contacting vessel to produce the ammonia scrubbing liquid comprising dissolved $CO_2$.

18. A method for recovery of ammonium values from anaerobic digestion of solid-containing waste from fermentation processes comprising:
  a. anaerobically digesting at least a portion of said solid-containing waste in an aqueous digestion liquor to generate ammonia or ammonium;
  b. passing through the aqueous digestion liquor a gas comprising greater than 50 volume percent carbon dioxide in an amount sufficient to maintain the pH of the aqueous digestion liquor between about 6.5 and 7.5 and generate a scrubbed gaseous stream; and
  c. recovering ammonia from at least one of the aqueous digestion liquor of step (a) or the scrubbed gaseous stream of step (b).

19. The process of claim 18 wherein the gas containing greater than 50 volume percent carbon dioxide is a tail gas from the anaerobic fermentation of syngas to oxygenated organic product.

20. The process of claim 18 wherein gas containing the carbon dioxide also contains hydrogen and carbon monoxide and the anaerobic digestion bioconverts at least a portion of the hydrogen and carbon dioxide and at least a portion of the hydrogen and carbon monoxide to ethane to provide a scrubbed gaseous stream having a greater energy density than the gas provided to the anaerobic digestion.

21. In a fermentation process for the anabolic bioconversion of a substrate in an aqueous fermentation broth containing microorganisms, said process generating solid waste, the improvement comprising:
  a. anaerobically digesting at least a portion of said waste solids in an aqueous digestion liquor to generate at least one of ammonia or ammonium and carbon dioxide, and provide a digestion liquor containing ammonia, ammonium carbonate and ammonium bicarbonate;
  b. providing the digestion liquor at a pH and temperature sufficient to convert at least a portion of the ammonium in the liquor to free ammonia and provide a converted liquor;
  c. stripping the ammonia and the free ammonia from the converted liquor in an ammonia stripping vessel to produce a gas phase ammonia stream; and
  d. using directly or indirectly at least a portion of the gas phase ammonia stream as a source of nitrogen for the anabolic fermentation.

22. The process of claim 21 wherein the ammonia from step (c) is contacted with an ammonia scrubbing liquid to produce a product comprising at least one of ammonium bicarbonate and ammonium carbonate, and the product is used in step (d).

23. The process of claim 22 wherein the anabolic bioconversion is the anaerobic bioconversion of syngas to oxygenated organic product.

24. The process of claim 23 wherein the anabolic bioconversion produces a tail gas comprising hydrogen, carbon monoxide and carbon dioxide, and at least a portion of the tail gas is contacted with the digestion liquor.

* * * * *